United States Patent
Desphande et al.

(10) Patent No.: US 10,824,549 B1
(45) Date of Patent: Nov. 3, 2020

(54) SYSTEM AND METHOD FOR REGRESSION TESTING OF AN APPLICATION PROGRAMMING INTERFACE

(71) Applicant: Mesh Dynamics, Inc, Cupertino, CA (US)

(72) Inventors: Prasad Desphande, Bangalore (IN); Venkatesh Ganti, Cupertino, CA (US); Rahul Lahiri, Belmont, CA (US); Ashoke Sudhakar, Bangalore (IN); Ravi Vijay, Bikaner (IN)

(73) Assignee: Mesh Dynamics, Inc, Cupertino, CA (US)

( * ) Notice: Subject to any disclaimer, the term of this patent is extended or adjusted under 35 U.S.C. 154(b) by 0 days.

(21) Appl. No.: 16/883,979

(22) Filed: May 26, 2020

Related U.S. Application Data (63) Continuation of application No. 16/877,953, filed on May 19, 2020, now abandoned.

(51) Int. Cl.
  *G06F 11/36* (2006.01)
  *G06N 20/00* (2019.01)
  (Continued)

(52) U.S. Cl.
  CPC ...... *G06F 11/3688* (2013.01); *G06F 11/3664* (2013.01); *G06F 11/3684* (2013.01);
  (Continued)

(58) Field of Classification Search
  None
  See application file for complete search history.

(56) References Cited

U.S. PATENT DOCUMENTS

| | | |
|---|---|---|
| 6,862,696 B1 | 3/2005 | Voas et al. |
| 7,779,036 B2 * | 8/2010 | Subramanian ...... G06F 11/3668 707/791 |

(Continued)

FOREIGN PATENT DOCUMENTS

CN    110704316 A    1/2020

OTHER PUBLICATIONS

Chris Colosimo; To make API testing easier, add machine learning to your AI; Oct. 2, 2018.
(Continued)

*Primary Examiner* — Philip Wang
(74) *Attorney, Agent, or Firm* — Jason C. Cameron (57) ABSTRACT

A system for testing of an application programming interface (API) is disclosed. The system includes a usage data collection source to track a trace identity associated with at least one message exchange pattern of the API using an end to end tracing (E2E) technique, captures usage data of an application in one or more modes, wherein the usage data corresponds to the trace identity. A usage data selection subsystem selects a predefined strata of usage data. A test case generation learning subsystem generates multiple test cases. A mocking subsystem use the trace identity to simulate the at least one message pattern associated with the usage data from a current version of the application against an updated version of the application. A comparison subsystem records an actual result, compares the actual result with an expected result and generates a test result upon comparison of the actual result with the expected result.

20 Claims, 5 Drawing Sheets

(51) Int. Cl.
*H04L 9/06* (2006.01)
*G06N 5/04* (2006.01)
*G06F 16/23* (2019.01)

(52) U.S. Cl.
CPC ...... *G06F 11/3692* (2013.01); *G06F 16/2379* (2019.01); *G06N 5/04* (2013.01); *G06N 20/00* (2019.01); *H04L 9/06* (2013.01); *H04L 2209/16* (2013.01)

(56) References Cited

U.S. PATENT DOCUMENTS

| | | | | |
|---|---|---|---|---|
| 8,010,950 | B1* | 8/2011 | Silaev | G06F 11/3672 |
| | | | | 717/131 |
| 8,275,586 | B2* | 9/2012 | Birch | G06F 11/3692 |
| | | | | 703/2 |
| 8,842,578 | B1 | 9/2014 | Zisapel | |
| 8,862,950 | B1* | 10/2014 | Ginsberg | G06F 11/3688 |
| | | | | 714/57 |
| 9,355,016 | B2 | 5/2016 | Baril et al. | |
| 9,514,036 | B1* | 12/2016 | Dusanapudi | G06F 11/263 |
| 9,959,201 | B2* | 5/2018 | Abdirashid | G06F 11/3692 |
| 10,452,523 | B1 | 10/2019 | Vijayalekshmi | |
| 2013/0290932 | A1* | 10/2013 | Kruglick | G06F 11/3688 |
| | | | | 717/124 |
| 2017/0039133 | A1* | 2/2017 | Rai | G06F 11/3688 |
| 2019/0095318 | A1* | 3/2019 | Bahrami | G06F 11/3676 |
| 2019/0188121 | A1* | 6/2019 | Simon | G06F 11/3688 |
| 2019/0384699 | A1* | 12/2019 | Arbon | G06N 3/006 |

OTHER PUBLICATIONS

Getting started with stubbing, mocking and service virtualization.
Sebastian Elbaum, Srikanth Karre, Gregg Rothermel; Improving Web Application Testing with User Session Data; Jun. 2003.
P. Saraph, M. Last, A. Kandel; Test case generation and reduction by automated input-output analysis; Nov. 2003.
Andrea Arcuri; RESTful API Automated Test Case Generation; Jan. 2019.

* cited by examiner

SYSTEM AND METHOD FOR REGRESSION TESTING OF AN APPLICATION PROGRAMMING INTERFACE

CROSS REFERENCE TO RELATED APPLICATIONS

This Application is a continuation of pending U.S. patent application Ser. No. 16/877,953, filed on May 19, 2020, entitled "System and Method for Regression Testing of an Application Programming Interface," which is hereby incorporated by reference in its entirety.

BACKGROUND

Embodiments of the present disclosure relate to a system for testing of software applications and more particularly, to a system and a method for regression testing of an application programming interface. The application programming interface (API) testing is a type of software testing which validates one or more APIs of the application. The purpose of the API testing is to check the functionality, reliability, performance, and security of the programming interfaces. In API testing, an information system is utilised to send calls to the API, get output, and observe the information system's response. Generally, the regression testing among one of the type of the software testing is used to test the functionality of the one or more APIs of the application. Mostly, it is often observed that the application is upgraded, or new versions of the existing application is released in a periodic manner. In order to achieve smooth functioning of such upgraded versions, the regression testing is used. The regression testing is done to verify that a modification of a feature in the application does not impact the existing functionality of the product. Also, the regression testing makes sure that the application works fine with new functionality, bug fixes or any change in the existing feature. As a result, various approaches are utilised which helps in testing the application by testing performance of the one or more APIs.

Conventionally, for testing of the APIs of the application, several manual resources are involved in generation of one or more test cases to test the application in multiple ways before the application is made live for one or more end-users. However, in such a conventional approach, during a testing period, the one or more test cases are manually generated by the testers and also such test cases are executed or re-executed repeatedly in order to verify the impact of change, which again consumes time and effort of the manual resources such as the testers. Also, the manually generated test cases are prone to one or more errors and perhaps result in degradation of accuracy and efficiency of a testing procedure. Moreover, such a conventional approach is also unable to test the application by mocking or simulating a real environment similar to a development and a test environment. As a result, accurate responses provided by the APIs corresponding to a request becomes difficult. Moreover, such a conventional approach also are unable to match the request with a corresponding response which sometimes creates ambiguity in the testing process of the API.

Hence, there is a need for an improved system and a method for regression testing of an application programming interface in order to address the aforementioned issues.

BRIEF DESCRIPTION

In accordance with an embodiment of the present disclosure, a system for regression testing of an application programming interface is disclosed. The system includes a usage data collection source to track a trace identity associated with at least one message exchange pattern of the application programming interface (API) using an end to end (E2E) tracing technique. The usage data collection source also captures usage data of an application in one or more modes, wherein the usage data corresponds to the trace identity associated with the at least one message exchange pattern. The system also includes a usage data selection subsystem to select a predefined strata of usage data from the usage data using a stratified sampling technique. The system also includes a test case generation learning subsystem to generate multiple test cases by learning selection of the predefined strata of usage data using a learning technique. The system also includes a mocking subsystem to use the trace identity associated with the at least one message exchange pattern of the usage data to simulate the at least one message pattern from a current version of the application against an updated version of the application in a test environment for application testing. The system also includes a comparison subsystem to record an actual result obtained from simulation of the at least one message pattern associated with the usage data in the test environment by enabling one or more mocking services. The comparison subsystem also compares the actual result with an expected result obtained from the multiple test cases based on a predefined set of comparison rules. The comparison subsystem also generate a test result for reviewing testing of the application based on at least one difference identified upon comparison of the actual result with the expected result.

In accordance with another embodiment of the present disclosure, a method for regression testing of an application programming interface is disclosed. The method includes tracking a trace identity associated with at least one message exchange pattern of an application programming interface (API) using an end to end (E2E) tracing technique. The method also includes capturing usage data of an application in one or more modes, wherein the usage data corresponds to the trace identity associated with the at least one message exchange pattern. The method also includes selecting a predefined strata of usage data from the usage data using a stratified sampling technique. The method also includes generating multiple test cases by learning selection of the predefined strata from the captured usage data using a learning technique. The method also includes using the trace identity associated with the at least one message exchange pattern of the usage data for simulating the at least one message exchange pattern from a current version of the application against an updated version of the application in a test environment for application testing. The method also includes recording an actual result obtained from simulation of the at least one message pattern associated with the usage data in the test environment by enabling one or more mocking services. The method also includes comparing the actual result with an expected result obtained from the multiple test cases based on a predefined set of comparison rules. The method also includes generating a test result for reviewing testing of the application based on at least one difference identified upon comparison of the actual result with the expected result.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system and a method for regression testing of an application programming interface. The system includes a usage data collection source to track a trace identity associated with at least one message exchange pattern of the application programming interface (API) using an end to end (E2E) tracing technique. The usage data collection source also captures usage data of an application in one or more modes, wherein the usage data corresponds to the trace identity associated with the at least one message exchange pattern. The system also includes a usage data selection subsystem to select a predefined strata of usage data from the usage data using a stratified sampling technique. The system also includes a test case generation learning subsystem to generate multiple test cases by learning selection of the predefined strata of usage data using a learning technique. The system also includes a mocking subsystem to use the trace identity associated with the at least one message exchange pattern of the usage data to simulate the at least one message exchange pattern from a current version of the application against an updated version of the application in a test environment for application testing. The system also includes a comparison subsystem to record an actual result obtained from simulation of the at least one message pattern associated with the usage data in the test environment by enabling one or more mocking services. The comparison subsystem also compares the actual result with an expected result obtained from the multiple test cases based on a predefined set of comparison rules. The comparison subsystem also generates a test result for reviewing testing of the application based on at least one difference identified upon comparison of the actual result with the expected result.

Figure 1:
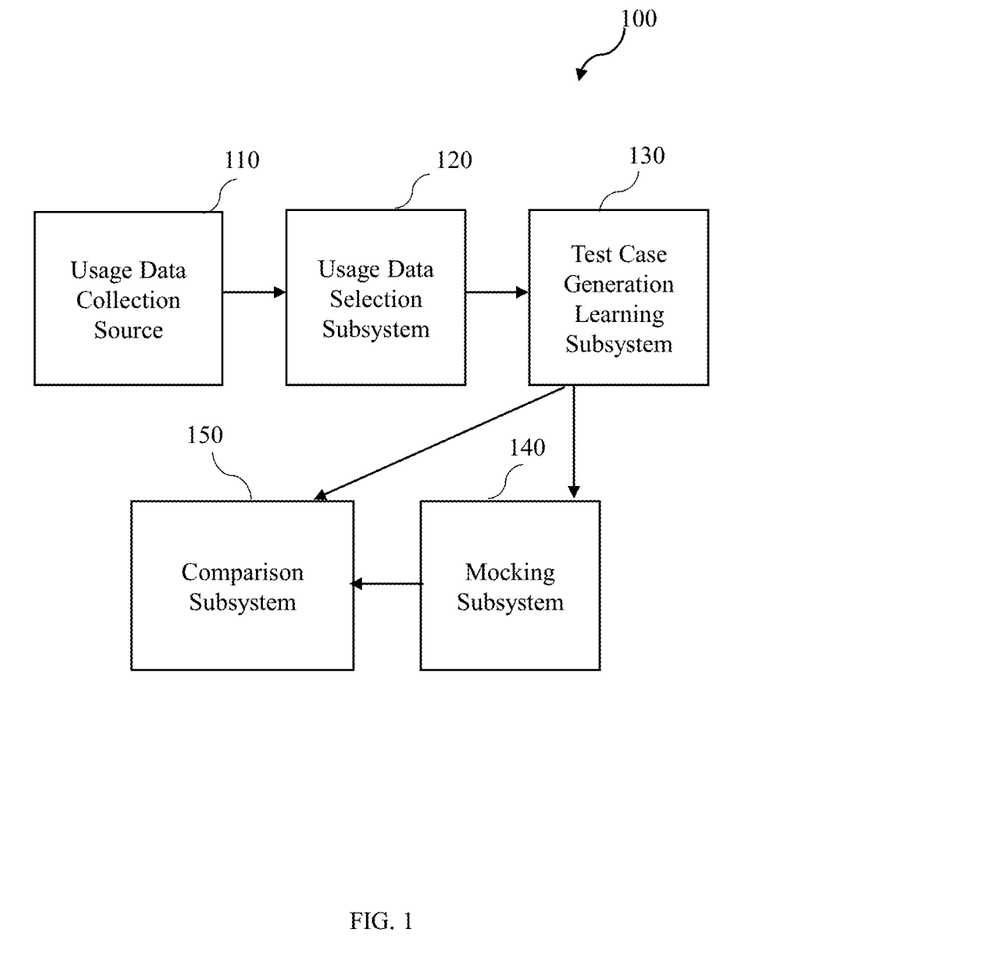
FIG. 1 is a block diagram of a system for regression testing of an application programming interface in accordance with an embodiment of the present disclosure.

FIG. 1 is a block diagram of a system 100 for regression testing of an application programming interface in accordance with an embodiment of the present disclosure. The system 100 includes a usage data collection source 110 to track a trace identity associated with at least one message exchange pattern of the application programming interface (API) using an end to end (E2E) tracing technique. As used herein, the term 'application programming interface (API)' is defined as a computing interface exposed by a particular application software, library, operating system or internet service, to allow third parties to use a functionality of the software application. Similarly, the term 'software application' used herein, is defined as a set of machine generated instructions or a group of machine generated instruction used to operate computers for executing specific end-user tasks. In one embodiment, the data collection source may include one or more virtual agents or listeners installed at various endpoints such as entry points or exit points of services or platforms of the application. In another embodiment, the usage data collection source may include a log store of the application. In one embodiment, the at least one message exchange pattern may include at least one of an incoming request, an incoming response, an outgoing request to an external service, an outgoing response from an external service, an outgoing request to a platform, an outgoing response from a platform or a combination thereof. The usage data collection source tracks the trace identity associated with the at least one message exchange pattern of the API as the application spawns off several requests to dependent services and platforms and further connecting all such downstream requests with the trace identity created at the request of the gateway. Even the responses associated with each of these requests are also tracked with the same trace identity. For example, the API call at a gateway of the application is tracked throughout the application using a same trace identity. If a gateway service calls other services which further calls the other dependent services or data infrastructure, then all nested requests and responses carry the same trace identity which helps in grouping all such requests and responses together. As used herein, the term 'gateway' is defined as a gating service that the application UI and all other applications calling the API have to communicate with.

The usage data collection source 110 also captures usage data of the application in one or more modes, wherein the usage data corresponds to the trace identity associated with the at least one message exchange pattern. In a specific embodiment, the usage data may include at least one of application programming interface (API) traffic data, aggregated customer or user generated data, limited production data or a combination thereof. In one embodiment, the one or more virtual agents may include at least one of a proxy agent, a service interface agent, a platform entry agent, a function-level agent or a combination thereof. In such embodiment, the proxy agent may capture the usage data by recording requests or responses from a firewall or on a dedicated proxy server. In another embodiment, the service interface agent may be built on a filter/interceptor framework offered by one or more frameworks to listen and act upon both incoming and outgoing requests or responses from a specific service. In yet another embodiment, the platform entry agent may capture the usage data from multiple platforms which may include, but not limited to relational databases, NoSQL® databases, AWS S3®, Redis® and the like. A driver such as Java database connectivity (JDBC) is packaged as a jar and wrapped with a thin layer to capture incoming and outgoing traffic. In such embodiment, one or more software development kits (SDK)s for accessing the Redis, NoSQL and the S3 may be instrumented automatically for listening and mocking. In one embodiment, the one or more modes may include a record mode to listen and record the at least one message exchange pattern such as requests and responses which are again logged to a file in a non-blocking fashion to reduce overhead in latency added to service requests. In another embodiment, the one or more modes may include a no-operation (noop) mode for bypassing the at least one message exchange pattern. In yet another embodiment, the one or more modes may also include a mock mode for mocking one or more services. In one embodiment, the one or more modes may be dynamically interchanged based on a predefined requirement.

The system 100 also includes a usage data selection subsystem 120 to select a predefined strata of usage data from the usage data using a stratified sampling technique. As used herein, the term 'strata' is defined as a subset or samples of a larger set of population (entire collection of items under consideration) which is being sampled. For example, often, each stratum is identifiable with a filter such as customer_state_address='CA'. For example, if source_ip=x, source_ip=y, then each stratum is identified with filter such as customer_state_address='CA', customer_state_address=ALL–CA, and the like. The stratified sampling technique selects predefined strata of the usage data which is relevant from the usage data to avoid unnecessary amount of data capturing and also to avoid significant delays in request and response latencies. In one embodiment, the stratified sampling technique may include at least one of a random sampling technique, a user session sampling technique, a sampling technique based on one or more parameters of the message exchange pattern of the application programming interface. In this embodiment, the user session sampling technique is a sticky sampling technique where all the message exchange patterns having the same session id are either always selected or always dropped. In such embodiment, the stratified sampling selects at random requests or sessions based on a sampling rate per stratum. Each stratum may have a different sampling rate. In a specific embodiment, identification of the relevant strata of the usage data to gather sufficient number of samples is based on one or more sampling strategies. In such embodiment, the one or more sampling strategies may include a subset of request parameters, a subset of response parameters, derivative characteristics of the request or response pairs such as latency, payload size of specific parameters, parameters value ranges and the like. In one embodiment, identification of the relevant strata of the usage data may be learnt by using a machine learning technique. In such embodiment, the machine learning technique may consider multiple options which may include, but not limited to, user configuration based on domain knowledge of the user, automatic tuning of the strata by the users and the like.

The system 100 also includes a test case generation learning subsystem 130 to generate multiple test cases by learning selection of the predefined strata of usage data using a learning technique. In one embodiment, the multiple test cases may be generated using the machine learning technique. In such embodiment, the machine learning technique may generate the multiple test cases based on learning from historical information corresponding to performance of the API for a particular scenario. The multiple test cases have a trace-id embedded in a header. These trace ids are reused during replay usage-simulation. The learning of generation of the multiple test cases includes removing one or more duplicate message exchange patterns such as requests or responses from a large number of captured message exchange patterns associated with the usage data while retaining complete user sessions. The learning also requires prioritising requests-based on a variety of input parameters.

The system 100 also includes a mocking subsystem 140 to use the trace identity associated with the at least one message exchange pattern of the usage data to simulate the at least one message exchange pattern from a current version of the application against an updated version of the application in a test environment for application testing. In one embodiment, a test driver may be used to simulate relevant traffic to the updated or a new version of the application, record new results, compare with the expected results captured earlier and highlight critical differences. In such embodiment, the test driver utilizes the trace-id captured from the usage data in each test request to replace one or more parameters such as authentication tokens, time span parameters, and the like with one or more newly generated parameters during mocking. The relevant traffic to simulate is selected from a set of at least one message pattern captured from the usage data. In one embodiment, the system 100 also includes a test configurator which enables one or more users such as engineers to select subsets of an application to be tested with one or more live services and which subset of the application needs to be mocked by the mocking subsystem 140.

The mocking subsystem 140 enables faithful high-fidelity mocking based on matching of parameters in the requests. The set of parameters to be used for matching is configurable, making the matching highly flexible. Further, it uses the trace-id for throwing different responses for exactly identical requests depending on a context of a request. The simulation adds the trace-ids in header which is used by the mocking subsystem 140. The mocking subsystem 140 enables any individual request to be simulated without requiring the platform, dependent services, and internal caches. The downstream requests from a gateway API request are all tied together with the trace-ids. Each gateway API request is chained with all the requests it generates, to one or more external services and their dependent services and data platforms. Therefore, such trace-ids associated with each gateway API request helps in retrieving all the requests and responses that together satisfies the originating gateway request. The mocking subsystem uses the trace-ids to identify the precise response that need to be returned as though the service or a platform being mocked is alive and in the required snapshot. In one embodiment, the one or more mocking services may include at least one of mocking one or more dependent services, mocking one or more databases, mocking one or more functions associated with application testing process mocking a platform, mocking one or more internal caches or a combination thereof. In such embodiment, the one or more mocking services may simulate behaviour of a service that the services being tested depends as though the dependent service were exactly at the snapshot at the time the request was recorded. In another embodiment, mocking the one or more databases may include simulating the responses of the one or more databases so that they match what was recorded in production. In yet another embodiment, mocking the one or more functions may include mocking one or more specific functions needed during testing. In such embodiment, mocking the one or more functions may include mocking a function accessing internal in memory caches or a token-based authentication and the like. In an embodiment, the one or more mocking services modifies at least one response based on mocking of one or more input parameters of at least one request. In one embodiment, the multiple parameters from the simulation of the at least one message exchange pattern by the test driver and mocking responses may be modified by injecting custom dynamic values.

In one non-limiting example, in case of mocking infrastructure such as Java® database connectivity (JDBC) and Cassandra® infrastructure, in certain cases, behavior of a function depends on a global state of an application and state of an object instance on which the function is called. In order to approximate the behavior of the function, a wrapper class which includes a combination of a trace-id associated with the API request and an instance id is utilized. The wrapper class is utilized to generate a same instance id in testing corresponding to the trace id used in recording the API request in a production environment. The same function may be called multiple times in same trace and on the same instance. As a result, the function calls are disambiguated by using the order of API requests and matching in the same order during mocking.

The system 100 also includes a comparison subsystem 150 to record an actual result obtained from simulation of the at least one message pattern associated with the usage data in the test environment by enabling one or more mocking services. Results from the simulated usage typically do not match with such responses recorded. There are multiple reasons for mismatches, wherein the multiple reasons or input parameters may include but not limited to, change in one or more field values from across runs, change in states of the databases or platforms used during simulation from when the usage data was captured, one or more genuine acceptable changes, one or more bugs or unexpected changes and the like.

The comparison subsystem 150 also compares the actual result with an expected result obtained from the multiple test cases based on a predefined set of comparison rules. In one embodiment, the predefined set of the comparison rules may include at least one of a data item path of the message exchange pattern, data type of the message exchange pattern, presence of an item in the message exchange pattern, data operation instruction for the message exchange pattern, comparison type for the message exchange pattern or a combination thereof. The comparison subsystem 150 also generates a test result for reviewing testing of the application based on at least one difference identified upon comparison of the actual result with the expected result. In one embodiment, the test result for reviewing the testing of the application may be leveraged as a JavaScript object notation (JSON) schema. In such embodiment, the test result may also be edited using the JSON schema.

Figure 2:
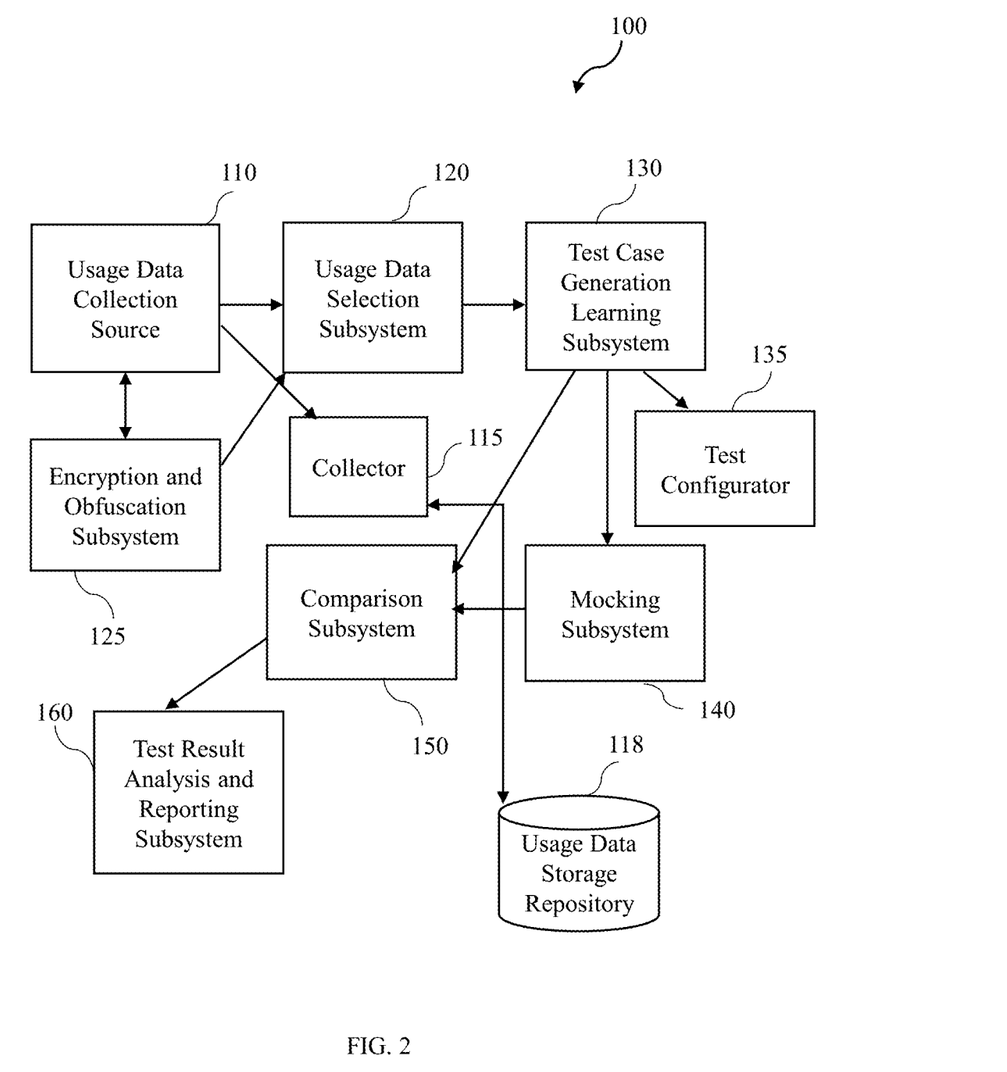
FIG. 2 is a block diagram representation of one embodiment of the system for regression testing of an application programming interface of FIG. 1 in accordance with an embodiment of the present disclosure.

FIG. 2 is a block diagram representation of one embodiment of the system 100 for regression testing of an application programming interface of FIG. 1 in accordance with an embodiment of the present disclosure. As described in aforementioned FIG. 1, the system 100 includes a usage data collection source 110, a usage data selection subsystem 120, a test case generation learning subsystem 130, a mocking subsystem 140 and a comparison subsystem 150. In one embodiment of FIG. 1, the system 100 also includes a test configurator 135 which enables one or more users to select subsets of an application for testing with live services and subsets of the application needs to be mocked by the mocking subsystem 140. In a specific embodiment, the system 100 further includes a test result analysis and reporting subsystem 160 to generate an action upon review of the test result to notify a user via multiple communication channels. In such embodiment, the action may include a bulk review and analysis of the test result obtained upon simulation. In such embodiment, the action may include, but not limited to, integration with an issue tracking platform to file a ticket, post to one or more collaboration tools, an electronic mail sent to the user for bug fixing and the like. In a particular embodiment, the system 100 further includes an encryption and obfuscation subsystem 125 to encrypt and obfuscate one or more fields of the usage data for one or more security purposes to maintain consistency across all the usage data. The consistency maintained helps in better functioning of both simulation and mocking function for testing the application. In such embodiment, the encryption may be performed to encode sensitive information of the usage data, wherein the usage data refers to application programming interface (API) traffic data both for simulating usage and for mocking responses. In such embodiment, the sensitive information may be encrypted by encrypting the one or more fields in production environment. In one embodiment, the sensitive fields may also be obfuscated for one or more security purposes. In such embodiment, the obfuscation may also reserve the formatting.

In a particular embodiment, the system 100 further includes a collector 115, to process the usage data captured by the usage data collection source 110 for storing in a usage data storage repository shown later in 118. The collector 115 gathers each log messages from the usage data collection source, processes them further, and then sends mini batches to the usage data storage repository. The collector's 115 deployment may be done in one of two options, wherein the two options may include a first option and a second option. The first option may include packaging or merging of the collector along with the data collection source to process just before logging to files. The second option includes an independent option, wherein the collector is deployed independently to pick up from log files. The independent option of the deployment is much more robust and scalable because processing is not done inside the application process. The overall application may have multiple collectors deployed but each agent is associated with only one collector at any given point.

Figure 3:
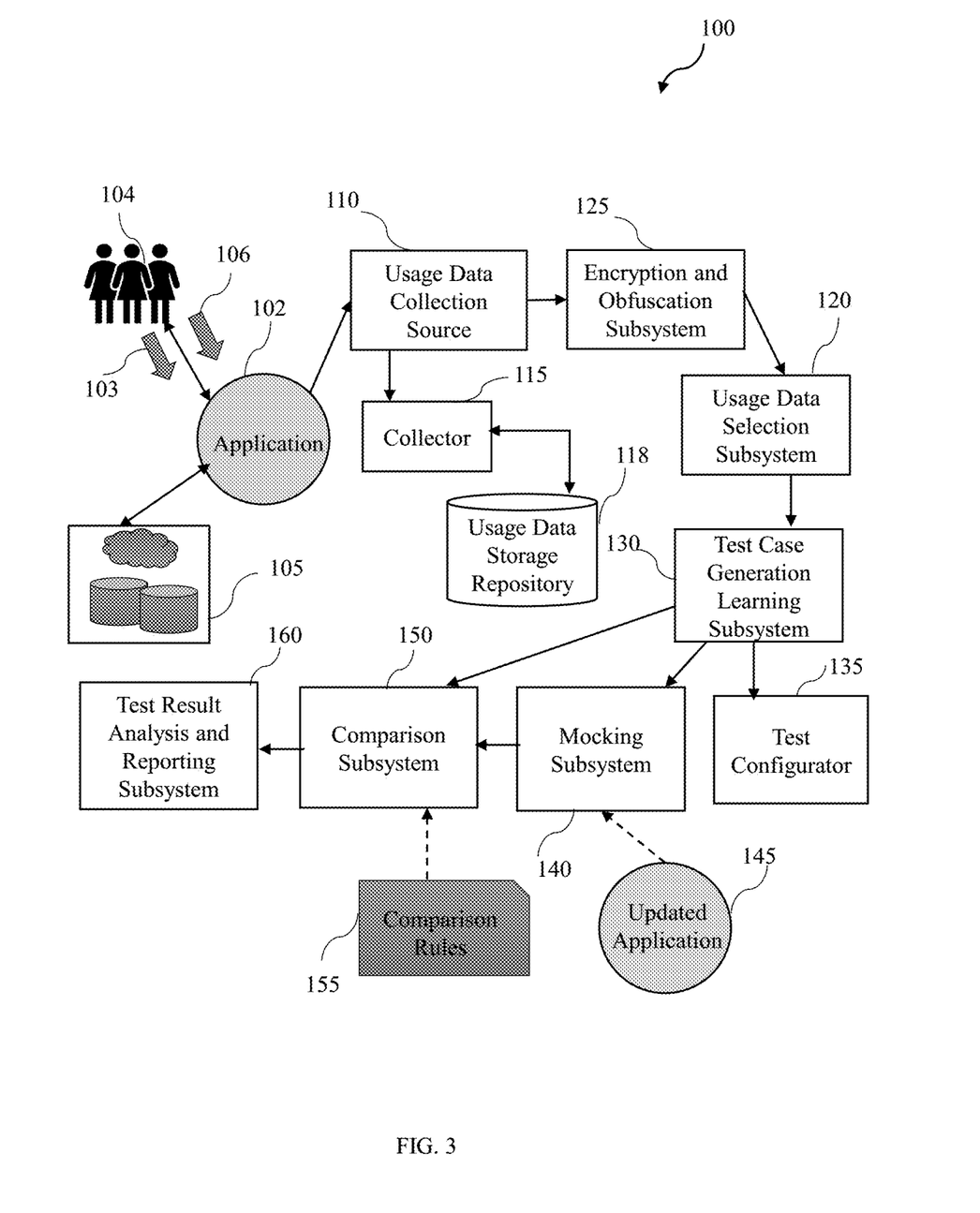
FIG. 3 illustrates a schematic representation of an exemplary embodiment of a system for regression testing of an application programming interface of FIG. 1 in accordance with an embodiment of a present disclosure.

FIG. 3 illustrates a schematic representation of an exemplary embodiment of a system 100 for regression testing of an application programming interface of FIG. 1 in accordance with an embodiment of a present disclosure. Generally, API testers spend a lot of time in understanding how APIs work in order to build that functionality into their test cases and as a result productivity and efficiency of the testing process degrades. The system 100 is utilized for automated regression testing of the APIs of the application 102 through value addition of machine learning technique for automatic API test case creation. Considering an example, of a finance application 102 that connects to one or more API to get market data. The API fetches the request from the user through a user interface and connects to backend 105 of the application 102 to provide a relevant response. In the example used herein, the finance application 102 receives at least one message exchange pattern such as at least one request from one or more users 104 through the API and further the finance application 102 by connecting with a market data API is able to fetch the market data. Let's assume that 2 different requests viz. request 1 103 corresponding to an enquiry of a stock market price for company 'A' and a request 2 106 corresponding to an enquiry of a stock market price for company 'B' are received from the one or more users 104 at two different instances of time.

The at least one request 103 and 106 received from the one or more users 104 have a corresponding trace identity (trace id) such as, a usage data collection source 110 of the application 102 tracks the trace identity associated with the at least one request of the application programming interface (API) using an end to end (E2E) tracing technique. The usage data collection source 110 may include one or more virtual agents or listeners which are installed at various entry or exit points in the application 102. Once, the trace id is tracked, usage data corresponding to the trace id is captured by the usage data collection source 110. For example, the usage data collection source such as the one or more virtual agents may include at least one of a proxy agent, a service interface agent, a platform entry agent, a function-level agent or a combination thereof. Moreover, the system 100 further includes an encryption and obfuscation subsystem 125 to encrypt and obfuscate one or more fields of the usage data for one or more security purposes. The encryption is performed to encode sensitive information of the usage data. Similarly, one or more sensitive fields of the usage data which is captured may be obfuscated for one or more security purposes.

Again, the usage data which is captured in real-time is of huge volume and variety, so selection of relevant samples/ strata or group of the usage data is essential. Capturing all of the usage data is unnecessary and also introduce significant delays in the request and response latencies. Hence, sampling of the usage data is performed in multiple ways. For example, the usage data which is captured is sampled into a predefined strata or groups by using a filter in such a manner, so that at least every strata has relevant requests or responses. The sampling of the usage data is done by a usage data selection subsystem 120 using a stratified sampling technique. In example used herein, the stratified sampling technique may include a random sampling technique, wherein the random sampling technique selects the predefined strata based on a sampling rate. An identification of the relevant predefined strata of the usage data to gather sufficient number of samples is again based on one or more sampling strategies. For example, the one or more strata definitions may be based on a subset of request parameters, a subset of response parameters, derivative characteristics of the request or response pairs such as latency, payload size of specific parameters, parameters value ranges and the like. Each of the strata may have different random sampling rates to collect enough test cases with a wide distribution to capture all usage of the application.

Upon sampling, the system 100 includes a test case generation learning subsystem 130 to generate multiple test cases based on the usage data using the machine learning technique. The test cases are generated to test the functionality of the API associated with the at least one request coming from the one or more users. In the example used herein, for the request 1 103 and the request 2 106, testing of the API for providing a corresponding response 1 and a corresponding response 2 respectively is tested by generation of the multiple test cases using the machine learning technique. Again, in order to test the API of the application in a test environment, simulation of requests associated with the usage from a current version of the application against an updated or a newer version is performed by a mocking subsystem 140. A test driver is used to simulate relevant traffic to the updated version 145 or a new version of the application, record new results, compare with the expected results captured earlier and highlight critical differences. A lightweight harness where all data state such as external data platforms and internal data caches are mocked. This configuration of testing ensures users to aggregate the usage data across disconnected intervals and also run tests based on the usage data captured in production because large scale production databases are no longer required. Also, from among all such requests and responses, filtration of responses to send back are done based on API path or function name, query parameters/arguments in case of a function, body parameters/arguments in case of the function, position in the sequence of requests and the like. Some of the query parameters and the body parameters are always different (e.g., requested, timestamp) between recording and simulation. Hence, in such a scenario, such parameters during matching are ignored so that mismatches due to inconsistencies/mismatches of data platform snapshots does not happen. Sometimes, there could be multiple matches for same request parameters since the multiple requests with same parameters could have been captured. To disambiguate these and find the exact match, trace-id is used in addition to the request parameters. The trace-id enables matching between the request 1 103, request 2 106 and the corresponding response 1, and 2 robustly even if there was another request potential request matching request 1.

Upon simulation, an actual result obtained from response associated with the API of the usage data in the test environment is recorded by a comparison subsystem 150. Also, an expected result obtained from the multiple test cases is compared with the actual result by the comparison subsystem 150 based on a predefined set of comparison rules 155. For example, the comparison rules 155 may include at least one of a data item path of the message exchange pattern, data type of the message exchange pattern, presence of an item in the message exchange pattern, data operation instruction for the message exchange pattern, comparison type for the message exchange pattern or a combination thereof. Again, a test result for reviewing testing of the application based on at least one difference identified upon comparison of the actual result with the expected result is generated by the comparison subsystem 150. For example, the test result for reviewing the testing of the application may be leveraged as a JavaScript object notation (JSON) schema. In such an example, the test result may also be edited using the JSON schema.

Further, a test result analysis and reporting subsystem 160 generates an action upon review of the test result to notify a user via a multiple of communication channels. The action here includes a bulk review and analysis of the test result obtained upon simulation. In the example used herein, the action may include, but not limited to, integration with an issue tracking platform to file a ticket, post to one or more collaboration tools, an electronic mail sent to the user for bug fixing and the like. So, here the test result review and the analysis helps in verification whether the functionality of the API for providing a correct response corresponding to a correct request is achieved or not. Also, the verification of the testing of the API including the tracing, sampling and mocking approaches in combination provides a significant amount of improvement in productivity as well as efficiency in the automated testing process.

Figure 4:
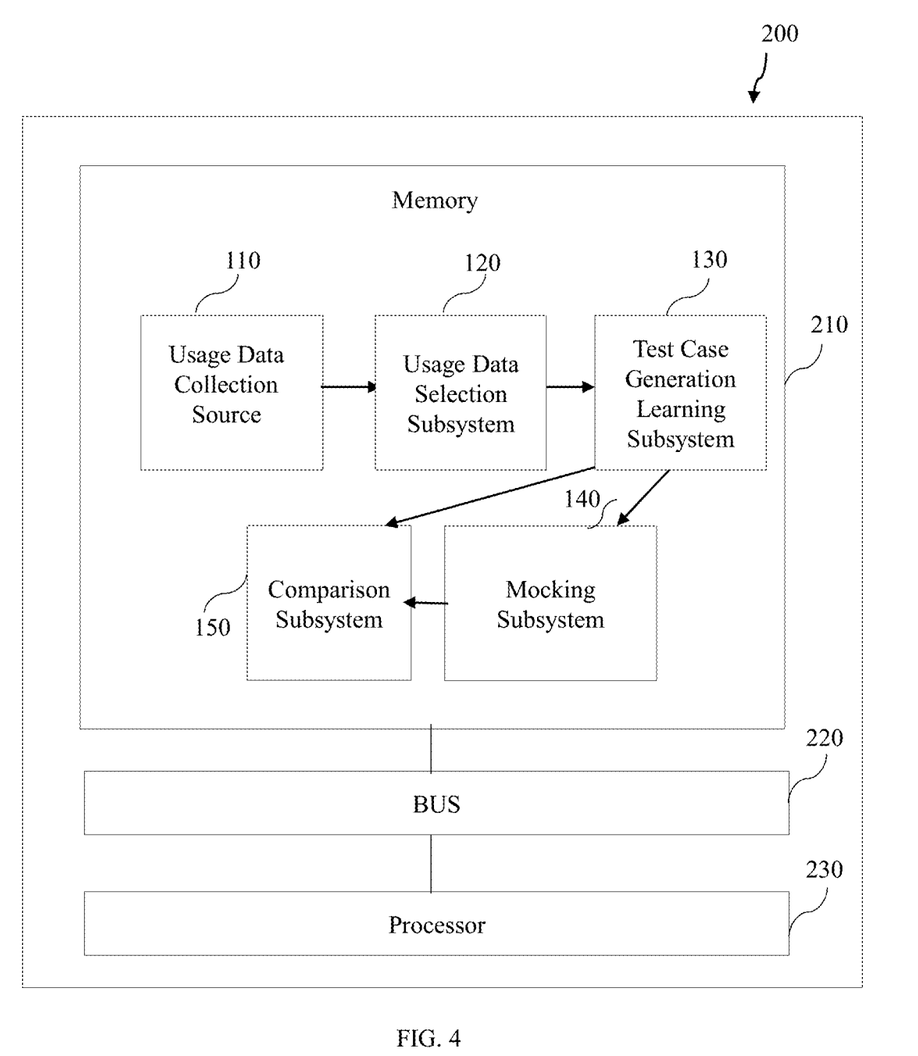
FIG. 4 is a block diagram of a computer or a server in accordance with an embodiment of the present disclosure.

FIG. 4 is a block diagram of a computer or a server in accordance with an embodiment of the present disclosure. The server 200 includes processor(s) 230, and memory 210 operatively coupled to the bus 220. The processor(s) 230, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 210 includes several subsystems stored in the form of executable program which instructs the processor 230 to perform the method steps illustrated in FIG. 1. The memory (210) is substantially similar to a system 100 of FIG. 1. The memory 210 has following subsystems: a usage data collection source 110, a usage data selection subsystem 120, a test case generation learning subsystem 130, a mocking subsystem 140 and a comparison subsystem 150.

The usage data collection source 110 tracks a trace identity associated with at least one message exchange pattern of the application programming interface (API) using an end to end (E2E) tracing technique. The usage data collection source 110 also captures usage data of an application in one or more modes, wherein the usage data corresponds to the trace identity associated with the at least one message exchange pattern. The usage data selection subsystem 120 selects a predefined strata of usage data from the usage data using a stratified sampling technique. The test case generation learning subsystem 130 generates multiple test cases by learning selection of the predefined strata of usage data using a learning technique. The mocking subsystem 140 use the trace identity associated with the at least one message exchange pattern of the usage data to simulate the at least one message exchange pattern from a current version of the application against an updated version of the application in a test environment for application testing. The comparison subsystem 150 records an actual result obtained from simulation of the at least one message pattern associated with the usage data in the test environment by enabling one or more mocking services. The comparison subsystem 150 also compares the actual result with an expected result obtained from the multiple test cases based on a predefined set of comparison rules. The comparison subsystem 150 also generate a test result for reviewing testing of the application based on at least one difference identified upon comparison of the actual result with the expected result.

The bus 220 as used herein refers to be internal memory channels or computer network that is used to connect computer components and transfer data between them. The bus 220 includes a serial bus or a parallel bus, wherein the serial bus transmit data in bit-serial format and the parallel bus transmit data across multiple wires. The bus 220 as used herein, may include but not limited to, a system bus, an internal bus, an external bus, an expansion bus, a frontside bus, a backside bus and the like.

Figure 5:
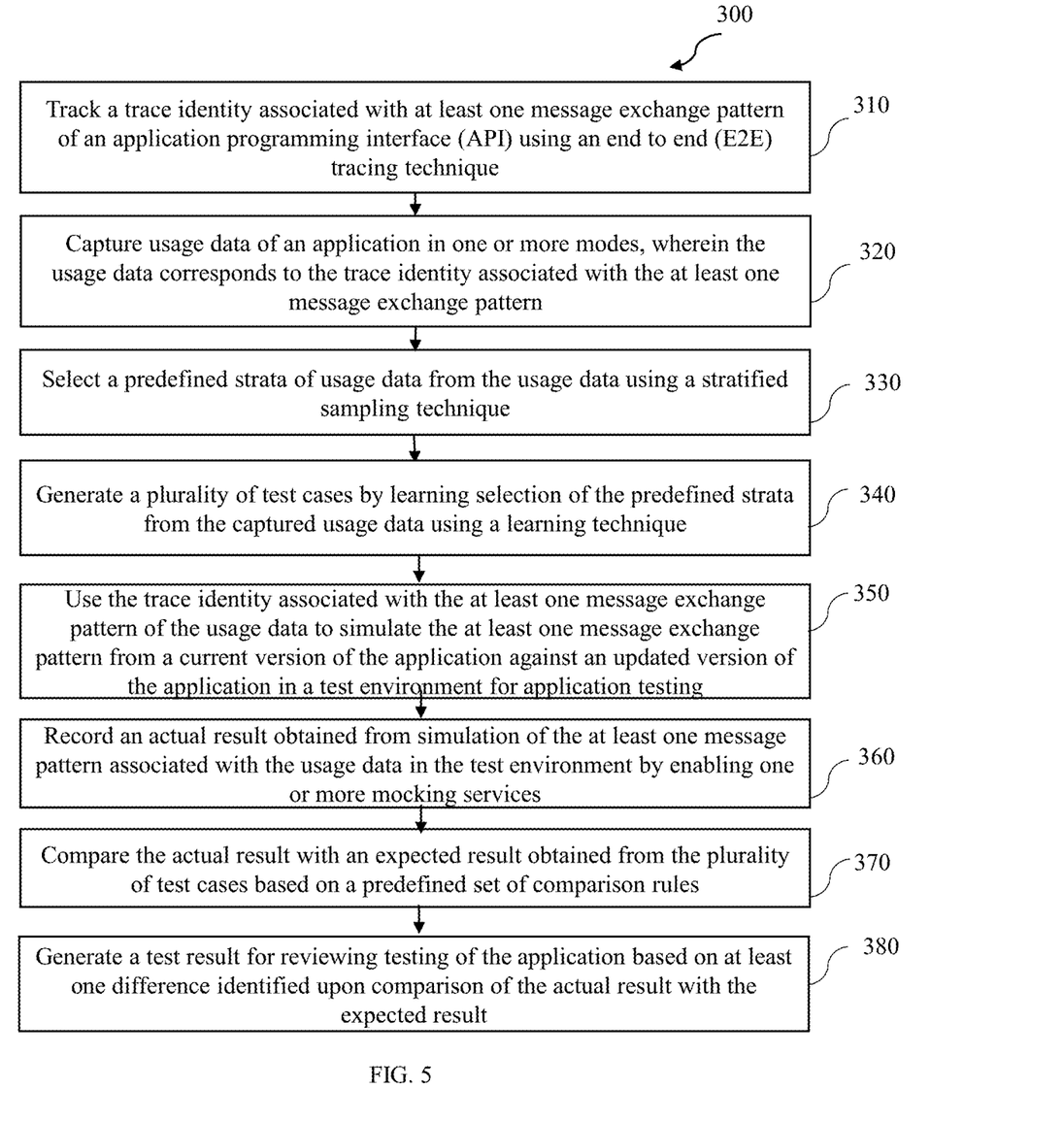
FIG. 5 is a flow chart representing the steps involved in a method for regression testing of an application programming interface of FIG. 1 in accordance with the embodiment of the present disclosure.

FIG. 5 is a flow chart representing the steps involved in a method 300 for regression testing of an application programming interface of FIG. 1 in accordance with the embodiment of the present disclosure. The method 300 includes tracking a trace identity associated with at least one message exchange pattern of an application programming interface (API) using an end to end (E2E) tracing technique in step 310. In one embodiment, tracking the trace identity associated with the at least one message exchange pattern of the API may include tracking the trace identity associated with at least one of an incoming request, an incoming response, an outgoing request to an external service, an outgoing response to an external service, an outgoing request to a platform, an outgoing response to a platform or a combination thereof of the API. In such embodiment, tracking the trace identity associated with the at least one message exchange pattern of the API using the E2E tracing technique may include tracking the trace identity associated with the at least one message exchange pattern by a usage data collection source. In such embodiment the usage data collection source may include one or more virtual agents or a log store of an application.

The method 300 also includes capturing usage data of an application in one or more modes, wherein the usage data corresponds to the trace identity associated with the at least one message exchange pattern in step 320. In one embodiment, capturing the usage data of the application may include capturing the usage data by the one or virtual agents which may include at least one of a proxy agent, a service interface agent, a platform entry agent, a function-level agent or a combination thereof. In an embodiment, capturing the usage data of the application in the one or more modes may include capturing the usage data which may include at least one of traffic data, aggregated customer or user generated data, limited production data or a combination thereof. In such embodiment, capturing the usage data in the one or more modes may include capturing the usage data in a record mode to listen and record the at least one message exchange pattern such as requests and responses which are logged to a file in a non-blocking fashion to reduce overhead in latency added to service requests. In another embodiment, the one or more modes may include a no-operation (noop) mode for bypassing the at least one message exchange pattern. In one embodiment, the one or more modes may be dynamically interchanged based on a predefined requirement.

The method 300 also includes selecting a predefined strata of usage data from the usage data using a stratified sampling technique in step 330. In one embodiment, selecting the predefined strata of the usage data using the stratified sampling technique may include selecting the predefined strata by using at least one of a random sampling technique, a user session sampling technique, a sampling technique based on one or more parameters of the message exchange pattern of the application programming interface or a combination thereof. In such embodiment, the stratified sampling selects the predefined strata based on a sampling rate. In a specific embodiment, identification of predefined relevant strata of the usage data to gather sufficient number of samples is based on one or more sampling strategies. In such embodiment, the one or more sampling strategies may include a subset of request parameters, a subset of response parameters, derivative characteristics of the request or response pairs such as latency, payload size of specific parameters, parameters value ranges and the like.

The method 300 also includes generating multiple test cases by learning selection of the predefined strata from the captured usage data using a learning technique in step 340. In one embodiment, generating the multiple test cases by learning the selection of the predefined strata of usage data from the usage data may include generation of the multiple test cases based on learning from historical information corresponding to performance of the API for a particular scenario.

The method 300 also includes using the trace identity associated with the at least one message exchange pattern of the usage data for simulating the at least one message exchange pattern from a current version of the application against an updated version of the application in a test environment for application testing in step 350. In one embodiment, simulating the at least one message exchange pattern associated with the usage data may include simulating relevant traffic or the usage data to the updated or a new version of the application by a test driver, recording new results upon simulation, comparing with the expected results captured earlier and highlighting one or more critical differences.

The method (300) also includes recording an actual result obtained from simulation of the at least one message pattern associated with the usage data in the test environment by enabling one or more mocking services in step 360. In an embodiment, recording the actual result obtained from the simulation of the at least one message pattern associated with the usage data in the test environment may include recording the actual result obtained from the simulation upon mocking of at least one of mocking one or more dependent services, mocking one or more databases, mocking one or more functions associated with application testing process mocking a platform, mocking one or more internal caches or a combination thereof. In such embodiment, the one or more mocking services may simulate behaviour of a service that the services being tested depends as though the dependent service were exactly at the snapshot at the time the request was recorded. In such embodiment, recording the actual result obtained from the simulation may include recording the actual result by tracking the trace identities associated with the at least one message exchange pattern to ensure mocking works correctly and simulates the stateful components/services such as databases faithfully.

In another embodiment, mocking the one or more databases may include simulating the responses of the one or more databases so that they match what was recorded in production. In yet another embodiment, mocking the one or more functions may include mocking one or more specific functions needed during testing. In such embodiment, mocking the one or more functions may include mocking a function accessing internal in memory caches or a token-based authentication and the like.

The method (300) also includes comparing the actual result with an expected result obtained from the multiple test cases based on a predefined set of comparison rules in step 370. In one embodiment, comparing the actual result with the expected result obtained from the multiple test cases may include comparing the actual result or response observed in a preparatory run with an expected response obtained from execution of the multiple test cases. In such embodiment, comparison between the actual result and the expected result is based on the predefined set of comparison rules which may include at least one of a data item path of the message exchange pattern, data type of the message exchange pattern, presence of an item in the message exchange pattern, data operation instruction for the message exchange pattern, comparison type for the message exchange pattern or a combination thereof.

The method 300 also includes generating a test result for reviewing testing of the application based on at least one difference identified upon comparison of the actual result with the expected result in step 380. In one embodiment, generating the test result, for reviewing the testing of the application may include generating the test result or reviewing the testing of the application by leveraging the test result as a JavaScript object notation (JSON) schema. In such embodiment, the test result may also be edited using the JSON schema.

In a specific embodiment, the method 300 further includes notifying to generate an action upon review of the test result to notify a user via multiple communication channels. In one embodiment, the action performed by the user may include a bulk review and analysis of the test result obtained upon simulation. In one embodiment, the action upon the review may include, but not limited to, integration with an issue tracking platform to file a ticket, post to one or more collaboration tools, an electronic mail sent to the user for bug fixing and the like.

In a particular embodiment, the method 300 further includes encrypting and obfuscating one or more fields of the usage data for one or more security purposes. In such embodiment, encrypting the one or more fields may include encrypting the sensitive information of the usage data. In such embodiment, the sensitive information may be encrypted by encrypting the one or more fields in production environment. In one embodiment, the sensitive fields may also be obfuscated for one or more security purposes. In such embodiment, the obfuscation may also reserve the formatting.

Various embodiments of the present disclosure provide a system for API testing by automatically generating test cases using machine learning technique which as a result not only saves time of the manual resources or testers but also increases productivity and efficiency of the testing.

Moreover, the present disclosed system tests the functionality of the API in the testing environment by mocking or simulation of the development environment with the testing environment without real utilisation of data layer or external services but by mocking or virtualization.

Furthermore, the present disclosed system provides a method of tracking or recording the trace-id of the requests associated with the API which further helps in avoiding mismatches between the responses and the requests and helps in providing exact response corresponding to the request based on matching the trace-id.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:

1. A system for regression testing of an application programming interface comprising:
   a usage data collection source configured to:
      track a trace identity associated with at least one message exchange pattern of the application programming interface using an end to end tracing technique; and
      capture usage data of an application in one or more modes, wherein the usage data corresponds to the trace identity associated with the at least one message exchange pattern;
   a usage data selection subsystem operatively coupled to the usage data collection source, wherein the usage data selection subsystem is configured to select a predefined strata of usage data from the usage data using a stratified sampling technique;
   a test case generation learning subsystem operatively coupled to the usage data selection subsystem, wherein the test case generation learning subsystem is configured to generate a plurality of test cases by learning selection of the predefined strata of usage data using a learning technique;
   a mocking subsystem operatively coupled to the test case generation learning subsystem, wherein the mocking subsystem is configured to use the trace identity associated with the at least one message exchange pattern of the usage data to simulate the at least one message exchange pattern from a current version of the application against an updated version of the application in a test environment for application testing; and
   a comparison subsystem operatively coupled to the test case generation learning subsystem, wherein the comparison subsystem is configured to:
      record an actual result obtained from simulation of the at least one message pattern associated with the usage data in the test environment by enabling one or more mocking services;
      compare the actual result with an expected result obtained from the plurality of test cases based on a predefined set of comparison rules; and
      generate a test result for reviewing testing of the application based on at least one difference identified upon comparison of the actual result with the expected result.

2. The system of claim 1, wherein the data collection source comprises one or more virtual agents or a log store or a combination thereof.

3. The system of claim 2, wherein the one or more agents comprises at least one of a proxy agent, a service interface agent, a platform entry agent, a function-level agent or a combination thereof.

4. The system of claim 1, wherein the at least one message exchange pattern comprises at least one of an incoming request, an incoming response, an outgoing request to an external service, an outgoing response to an external service, an outgoing request to a platform, an outgoing response to a platform or a combination thereof.

5. The system of claim 1, wherein the usage data comprises at least one of application programming interface traffic data, aggregated customer or user generated data, limited production data or a combination thereof.

6. The system of claim 1, wherein the one or more modes comprises a record mode, mock mode or a no-operation mode.

7. The system of claim 1 comprising a collector operatively coupled to the usage data collection source, wherein the collector is configured to process the usage data captured by the usage data collection source for storing in a usage data storage repository.

8. The system of claim 1, wherein the stratified sampling technique comprises at least one of a random sampling technique, a user session sampling technique, a sampling technique based on one or more parameters of the message exchange pattern of the application programming interface.

9. The system of claim 1, comprising a test configurator configured to enable one or more users to select subsets of an application to be tested with one or more live services and subsets of the application to be mocked.

10. The system of claim 1, comprising a test driver configured to drive a subset of the usage data for simulation of usage against the updated version of the application in the test environment.

11. The system of claim 1, wherein the one or more mocking services comprises at least one of mocking one or more dependent services, mocking one or more databases, mocking one or more functions associated with application testing process mocking a platform, mocking one or more internal caches or a combination thereof.

12. The system of claim 11, wherein the one or more mocking services modifies at least one response based on mocking of one or more input parameters of at least one request.

13. The system of claim 1, wherein the using the mocking subsystem utilizes the trace identity associated with the at least one request for modifying at least one response corresponding to the at least one request of a similar context to achieve fidelity mocking.

14. The system of claim 1, wherein the predefined set of comparison rules comprises a set of assertion rules for comparison of the test result, wherein the set of assertion rules comprises at least one of a data item path of the message exchange pattern, data type of the message exchange pattern, presence of an item in the message exchange pattern, data operation instruction for the message exchange pattern, comparison type for the message exchange pattern or a combination thereof.

15. The system of claim 1, further comprising a test result analysis and reporting subsystem operatively coupled to the comparison subsystem, wherein the test result analysis and reporting subsystem is configured to generate an action upon review of the test result to notify a user via a plurality of communication channels.

16. The system of claim 1, further comprising an encryption and obfuscation subsystem operatively coupled to the usage data selection subsystem, wherein the encryption and obfuscation subsystem is configured to encrypt and obfuscate one or more fields of the usage data for one or more security purposes maintaining consistency.

17. A method for regression testing of an application programming interface comprising:
  tracking, by a usage data collection source, a trace identity associated with at least one message exchange pattern of an application programming interface (API) using an end to end (E2E) tracing technique;
  capturing, by the usage data collection source, usage data of an application in one or more modes, wherein the usage data corresponds to the trace identity associated with the at least one message exchange pattern;
  selecting, by a usage data selection subsystem, a predefined strata of usage data from the usage data using a stratified sampling technique;
  generating, by a test case generation learning subsystem, a plurality of test cases by learning selection of the predefined strata from the captured usage data using a learning technique;
  using, by a mocking subsystem, the trace identity associated with the at least one message pattern of the usage data to simulate the at least one message exchange pattern from a current version of the application against an updated version of the application in a test environment for application testing;
  recording, by a comparison subsystem, an actual result obtained from simulation of the at least one message pattern associated with the usage data in the test environment by enabling one or more mocking services;
  comparing, by the comparison subsystem, the actual result with an expected result obtained from the plurality of test cases based on a predefined set of comparison rules; and
  generating, by the comparison subsystem, a test result for reviewing testing of the application based on at least one difference identified upon comparison of the actual result with the expected result.

18. The method of claim 17, wherein capturing the usage data of the application in the one or more modes comprises capturing the usage data in a record mode or a no-operation mode.

19. The method of claim 17, further comprising notifying, by a test result analysis and reporting subsystem, to generate an action upon review of the test result to notify a user via a plurality of communication channels.

20. The method of claim 17, further comprising encrypting and obfuscating, by an encryption and obfuscation subsystem, one or more fields of the usage data for one or more security purposes.

* * * * *